(12) United States Patent
Rothman et al.

(10) Patent No.: US 7,281,124 B2
(45) Date of Patent: Oct. 9, 2007

(54) ESTABLISHING A VIRTUAL DRIVE ACCESSIBLE TO PRE-BOOT AND OPERATING SYSTEM RUNTIME PHASES

(75) Inventors: Michael A. Rothman, Puyallup, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 393 days.

(21) Appl. No.: 10/870,188

(22) Filed: Jun. 17, 2004

(65) Prior Publication Data

US 2006/0020779 A1 Jan. 26, 2006

(51) Int. Cl.
*G06F 9/00* (2006.01)
*G06F 9/24* (2006.01)
*G06F 15/177* (2006.01)

(52) U.S. Cl. .............................. 713/1; 713/2; 713/100; 718/1; 718/100; 718/101; 718/102; 718/103; 718/104; 718/105; 718/106; 718/107; 718/108

(58) Field of Classification Search .................... 713/1, 713/2, 100; 718/1–108
See application file for complete search history.

(56) References Cited

U.S. PATENT DOCUMENTS

| 4,949,254 | A | * | 8/1990 | Shorter | 718/106 |
|---|---|---|---|---|---|
| 5,546,585 | A | * | 8/1996 | Soga | 713/2 |
| 6,195,650 | B1 | * | 2/2001 | Gaither et al. | 707/1 |
| 6,411,943 | B1 | * | 6/2002 | Crawford | 705/400 |
| 6,944,699 | B1 | * | 9/2005 | Bugnion et al. | 710/269 |
| 7,080,051 | B1 | * | 7/2006 | Crawford | 705/400 |
| 2002/0143842 | A1 | * | 10/2002 | Cota-Robles et al. | 709/1 |
| 2005/0066060 | A1 | * | 3/2005 | Pinkerton et al. | 709/249 |
| 2005/0076155 | A1 | * | 4/2005 | Lowell | 710/1 |
| 2005/0240685 | A1 | * | 10/2005 | Keys | 710/8 |
| 2005/0240942 | A1 | * | 10/2005 | Hampton et al. | 719/321 |

OTHER PUBLICATIONS

*Extensible Firmware Interface Specification*, version 1.10, Dec. 1, 2002, http://developer.intel.com/technology/efi, Section 1 (1-1-1-14), Section 3 (3-1-3-8), Total pp. (including title page & table of contents) 46.
*Intel® Platform Innovation Framework for EFI*, Version 0.9, Sep. 16, 2003, www.intel.com/technology/framework, pp. 11-18, 61-66, Total pages (including title page & table of contents) 21.

* cited by examiner

*Primary Examiner*—Rehana Perveen
*Assistant Examiner*—James F. Sugent
(74) *Attorney, Agent, or Firm*—Blakely, Sokoloff, Taylor & Zafman LLP

(57) ABSTRACT

A method, system and article of manufacture to establish a virtual drive accessible to pre-boot and operating system runtime phases. A virtual drive is constructed from a physical storage device of a computer system during a pre-boot phase of the computer system. A virtual drive controller is initialized during the pre-boot phase to support the virtual drive. Information on the virtual drive is accessed using the virtual drive controller by firmware during the pre-boot phase. The information on the virtual drive is accessed using the virtual drive controller by an operating system (OS) of the computer system during an OS runtime phase, wherein the information is comprehensible by the firmware and the OS.

22 Claims, 7 Drawing Sheets

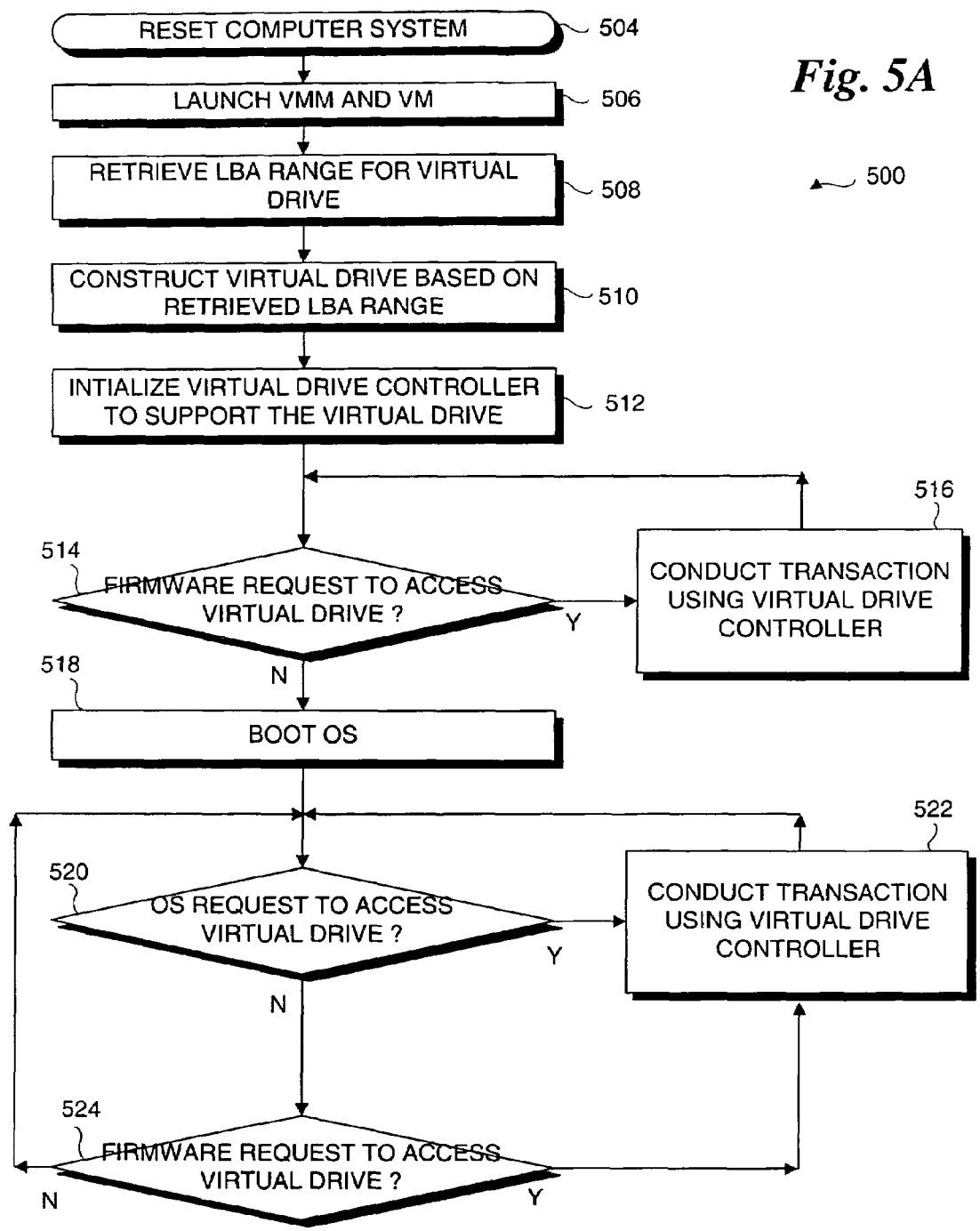

ESTABLISHING A VIRTUAL DRIVE ACCESSIBLE TO PRE-BOOT AND OPERATING SYSTEM RUNTIME PHASES

BACKGROUND

1. Field

Embodiments of the invention relate to the field of computer systems and more specifically, but not exclusively, to establishing a virtual drive accessible to pre-boot and operating system runtime phases.

2. Background Information

Generally, the pre-boot phase is defined as the period of time between computer system startup and the OS taking control of the system. At the startup of a typical computer system, firmware is loaded from non-volatile storage, such as Read-Only Memory (ROM), and executed. The firmware is sometimes referred to as the system Basic Input/Output System (BIOS). The firmware initializes the platform hardware, performs system tests, and prepares the system for the operating system (OS) to take control.

When the OS takes control of the system, the period commonly known as OS runtime begins. During OS runtime, the firmware may act as an interface between software and hardware components of a computer system. Such interface services include assisting with software interrupts.

In current systems, information cannot be shared between the pre-boot phase and the OS runtime phase of the platform. There is no storage resource that is commonly accessible to the pre-boot and the OS runtime environments. Thus, file sharing between the phases is problematic. Also, most operating systems store information based on a proprietary file system and file format that cannot be comprehended by the firmware of the computer system.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 5A is a flowchart illustrating one embodiment of the logic and operations to establish a virtual drive accessible to pre-boot and OS runtime phases in accordance with the teachings of the present invention.

DETAILED DESCRIPTION

In the following description, numerous specific details are set forth to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring understanding of this description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
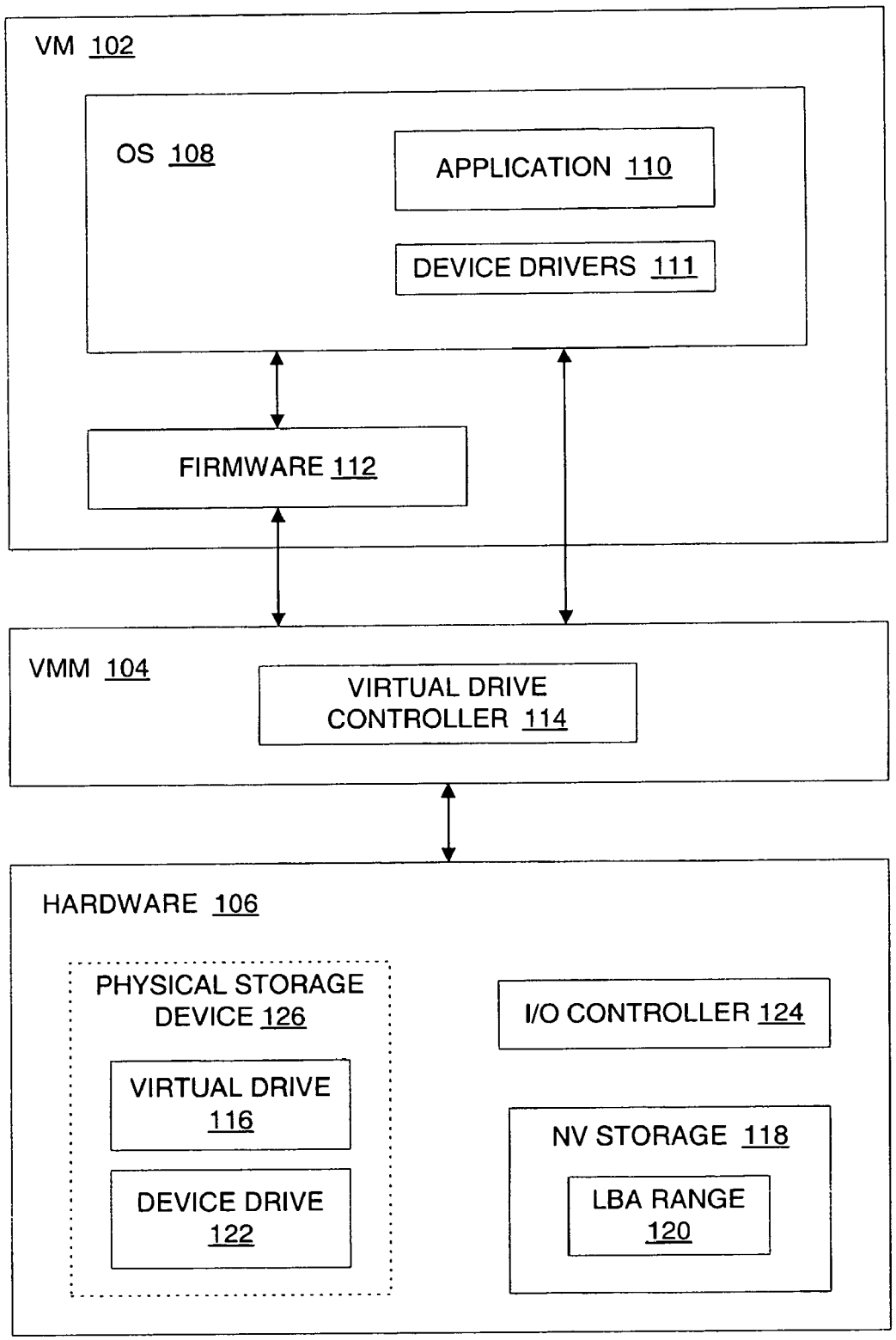
FIG. 1 is a block diagram illustrating one embodiment of an environment that supports a virtual drive in accordance with the teachings of the present invention.

Referring to FIG. 1, one embodiment of a computer system 100 is shown. Computer system 100 includes a Virtual Machine (VM) 102 layered on top of a Virtual Machine Monitor (VMM) 104. VMM 104 is layered on top of the platform hardware 106. While FIG. 1 shows one VM 102, computer system 100 may include multiple VMs layered on VMM 104.

A VM behaves like a complete physical machine. Usually, each VM session is given the illusion by the VMM that it is the only physical machine. The VMM usually takes control whenever a VM attempts to perform an operation that may affect the whole computer system. Each VM supports a corresponding OS and firmware. Multiple VM sessions are separate entities and usually isolated from each other by the VMM. If one VM crashes or otherwise becomes unstable, the other VM should not be adversely affected.

VM 102 includes an operating system (OS) 108 and firmware 112. OS 108 includes at least one application 110 and device drivers 111. During the pre-boot phase, firmware 112 is loaded from non-violate storage. Generally, firmware 112 initializes the system hardware and then loads and initiates the OS loader. The OS runtime phase begins when the OS takes control of the system.

Firmware 112 may also provide services to OS 108 during OS runtime. In one embodiment, such services include supporting interaction with hardware 106 and handling software interrupts. In the embodiment of FIG. 1, OS 108 may communicate directly with VMM 104 to access platform hardware 106. The OS 108 may also request services from firmware 112 and the firmware 112 subsequently interacts with the hardware 106 via VMM 104. Additionally, the firmware 112 may initiate a transaction with hardware 106 without prompting from OS 108. In one embodiment, OS 108 and firmware 112 are unaware of that their interaction with platform hardware 106 is managed by VMM 104. OS 108 and firmware 112 are clients of VMM 104 to be serviced and monitored by the VMM 104.

Embodiments of firmware 112 may employ a firmware environment known as the Extensible Firmware Interface (EFI) (*Extensible Firmware Interface Specification*, Version 1.10, Dec. 1, 2002, available at http://developer.intel.com/technology/efi.) EFI enables firmware, in the form of firmware modules and drivers, to be loaded from a variety of different resources, including flash memory devices, option ROMs (Read-Only Memory), various persistent storage devices (e.g., hard disks, CD-ROM (Compact Disk-Read Only Memory), etc.), or from one or more computer systems over a computer network. One embodiment of an implementation of the EFI specification is described in the *Intel® Platform Innovation Framework for EFI Architecture Specification—Draft for Review*, Version 0.9, Sep. 16, 2003 (available at www.intel.com/technology/framework), hereinafter referred to as the "Framework." It will be understood that embodiments of the present invention are not limited to the "Framework" or implementations in compliance with the EFI specification.

In an EFI compliant system, EFI provides Boot Services are available during the pre-boot phase while Runtime Services are available during the pre-boot phase and OS runtime phase. In the "Framework" implementation of EFI, Boot Services include, but are not limited to, Memory Services to allocate memory, Image Services to load and execute executable image files, and Driver Support Services to access pre-boot drivers. Runtime Services in the "Framework" include, but are not limited to, Variable Services to access environmental variables from non-volatile storage and Status Code Services to send status codes to a system log.

Under the "Framework", when an OS loader is ready to assume control of the platform and all platform resource management, an ExitBootServices() call is issued. Once the ExitBootServices() returns successfully, Boot Services are no longer available, but Runtime Services survive into OS runtime. Under the "Framework," when the call to ExitBootServices() returns, OS runtime has been entered.

Referring again to FIG. 1, VMM 104 includes a virtual drive controller 114 to support a virtual drive 116. In one embodiment, virtual drive controller 114 is loaded from non-volatile storage, such as a flash memory device. In one embodiment, VMM 104 supports virtual drive controller 114.

Platform hardware 106 includes virtual drive 116 and non-volatile storage 118. Non-volatile (NV) storage 118 includes a magnetic storage device, an optical storage device, a non-violate storage device, such as flash memory, or the like. In the embodiment of FIG. 1, NV storage 118 has stored a virtual drive logical base address (LBA) range 120 used in constructing virtual drive 116 (discussed further below).

Virtual drive 116 is carved out of a physical storage device 126, such that virtual drive 116 and device drive 122 are advertised to VM 102 (and thus OS 108 and firmware 112). Platform hardware 106 also includes an input/output (I/O) controller 124 to support access to physical storage device 126. In one embodiment, I/O controller 124 includes an Integrated Drive Electronics (IDE) controller, and physical storage device 126 includes an IDE drive.

In one embodiment, firmware 112 and OS 108 may conduct transactions with virtual drive 116 as if virtual drive 116 is a separate IDE drive. IDE is a well-known standard for connecting storage devices to a bus of a computer system (see, *American National Standards Institute (ANSI) Advanced Technology Attachment (ATA)* specifications). A follow-on version of IDE is called Enhanced Integrated Drive Electronics (EIDE). It will be noted that the term IDE is used herein to refer to all variants of the IDE/ATA interface, including EIDE.

Usually, an IDE ribbon connects the motherboard to storage devices, such as hard disk drives. When access to the storage device is requested, a signal is sent to the IDE controller, which is usually a chipset residing on the motherboard. The IDE controller uses the IDE ribbon connectors to conduct the requested transaction with the storage device. While most storage devices today have on-board controllers, the IDE controller acts as an intermediary between the storage device's controller and the rest of the computer system.

In embodiments of the present invention, instead of allowing the input/output traffic to go directly to I/O controller 124, the virtual drive controller 114 may trap access to the I/O controller 124. The virtual drive controller 114 may re-route input/output flow and re-represent certain query-type of commands regarding the devices which the I/O controller 124 would normally represent. Virtual drive controller 114 interacts with I/O controller 124 to complete I/O requests. In one embodiment, from the point of view of OS 108 and firmware 112, the virtual drive controller 114 is indistinguishable from I/O controller 124.

In one embodiment, the virtual drive 116 may use a file system comprehensible by both the firmware 112 and the OS 108. Such file systems include, but are not limited to, File Allocation Table 12 (FAT12), FAT16, FAT32, or the like.

In another embodiment, information is maintained on the virtual drive 116 in a file format that is comprehensible to both firmware 112 and the OS 108. One embodiment of such a file format includes the Portable Executable (PE) file format, which is well known in the art. The Microsoft Corporation introduced the PE file format with Windows NT®. The PE file format serves as the executable file format for Windows® operating systems. In an implementation of EFI, Portable Executable and Common Object File Format (PE/COFF) executable images are used (see, *PE/COFF Specification*, Version 6.0, February 1999, available at http://www.microsoft.com/whdc/hwdev/hardware/pecoff.mspx).

EFI may use a form of the PE file format for EFI images. EFI images are a class of files defined by EFI that contain executable code. Generally, there are three types of EFI images that can be loaded and executed by EFI-compliant firmware. These are EFI Applications, EFI OS Loaders, and EFI Drivers. In one embodiment, EFI Applications include utilities and diagnostic tools that may be used by firmware 112 and OS 108.

In one embodiment of the present invention, virtual drive controller 114 may enforce policy as to the use of virtual drive 116. For example, the policy may designate that only PE files are to be stored on virtual drive 116. Thus, if a user attempts to store non-PE files on virtual drive 116, such as a Microsoft® Word document, virtual drive controller 114 may block the transaction and initiate an error message to the user.

Figure 2:
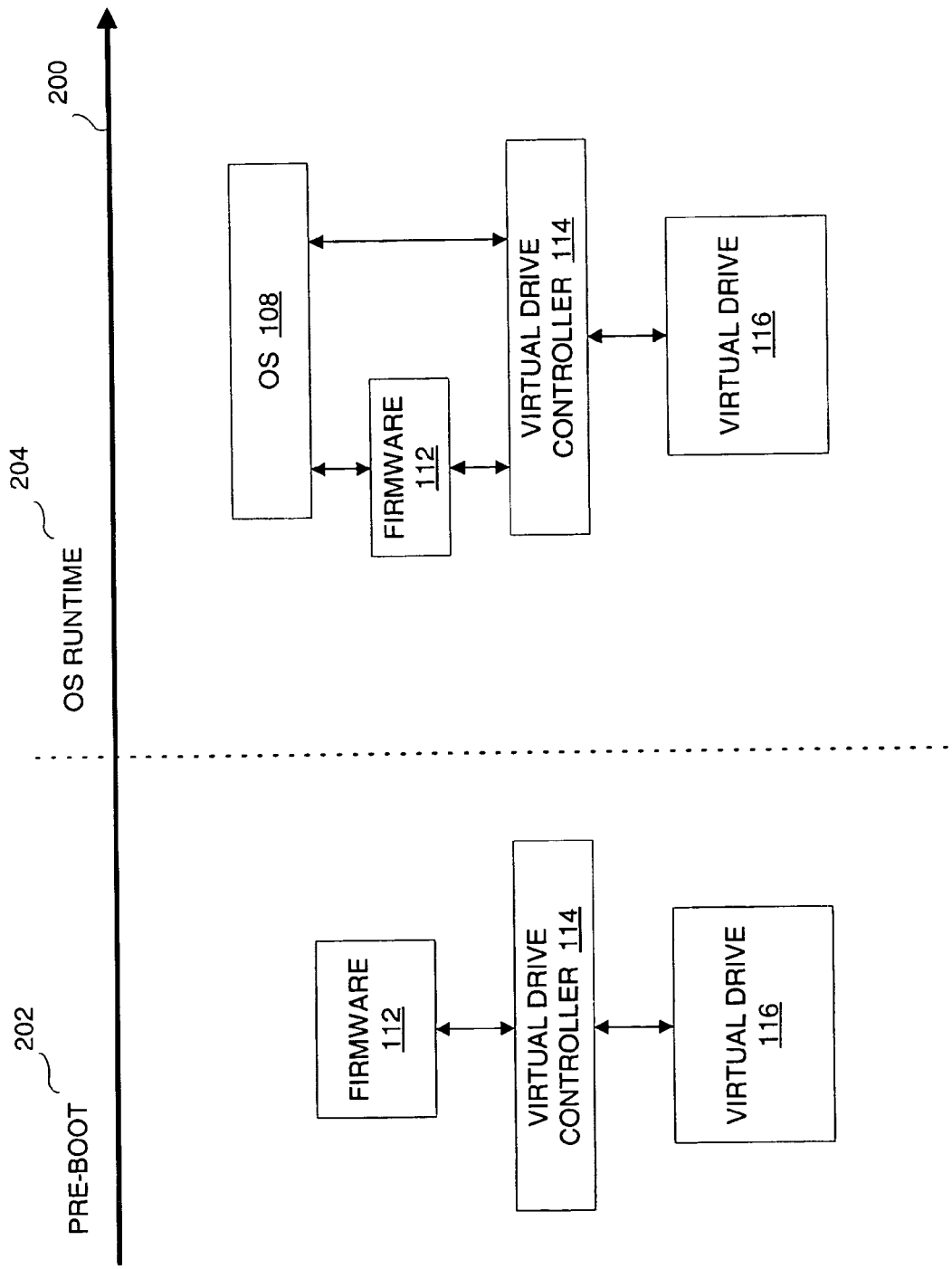
FIG. 2 is a block diagram illustrating one embodiment of an environment that supports a virtual drive in accordance with the teachings of the present invention.

Referring to FIG. 2, a computer system life cycle 200 is shown. At startup, the computer system enters a pre-boot phase 202. During pre-boot, virtual drive 116 is constructed and virtual drive controller 114 is initialized to support virtual drive 116. Firmware 112 may interact with virtual drive 116 using virtual drive controller 114 during pre-boot phase 202.

Moving to the right along the life cycle 200, the computer system enters OS runtime 204. During this phase, operating system 108 has been loaded and is executing. OS 108 may conduct transactions with virtual drive 116 via virtual drive controller 114 without going through firmware 112. In other instances, OS 108 may request services from firmware 112 for interaction with virtual drive 116. Firmware 112 may also interact with virtual drive 116 during OS runtime 204 without initiation from OS 108.

Figure 3:
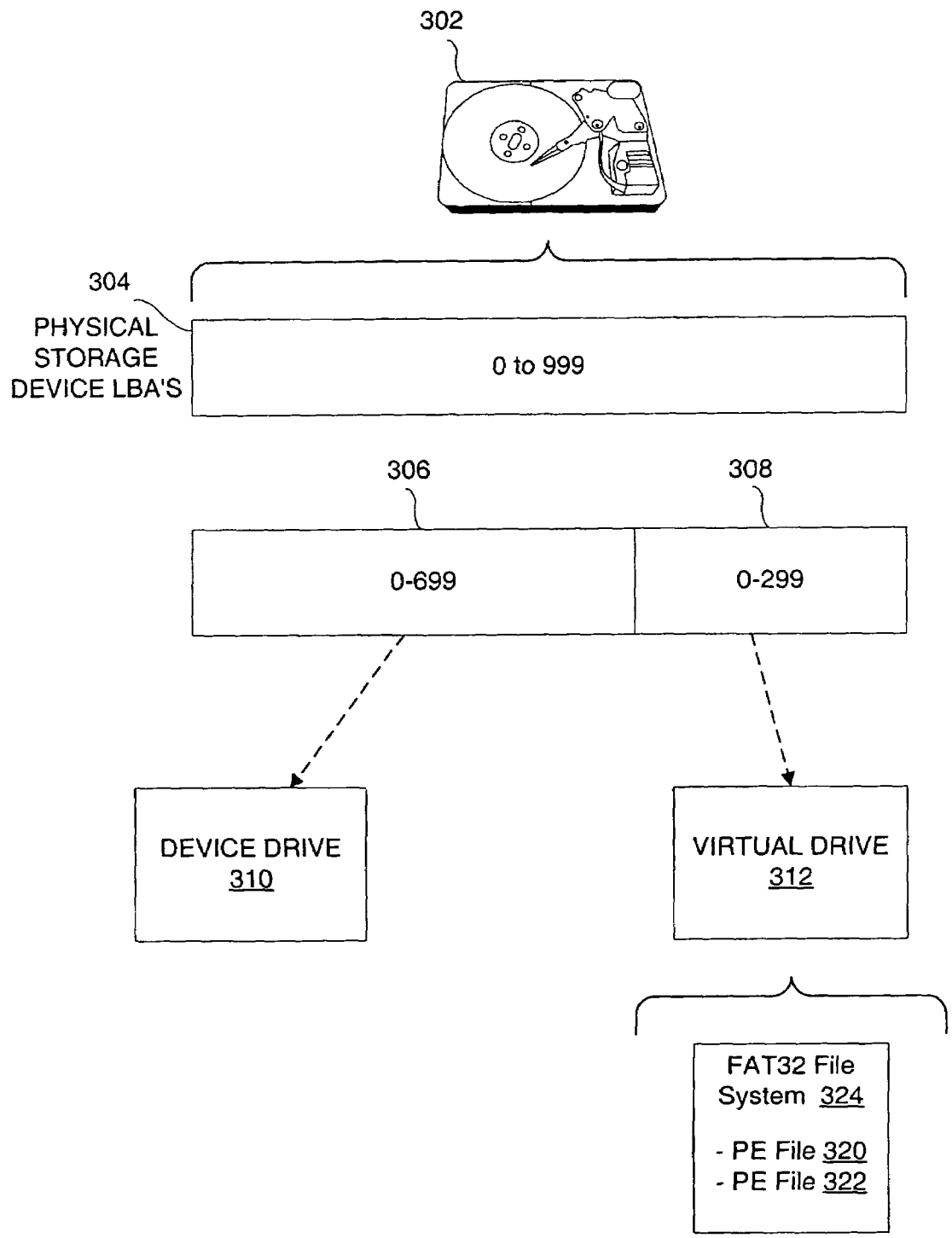
FIG. 3 is a block diagram illustrating one embodiment of a virtual drive in accordance with the teachings of the present invention.

Turning to FIG. 3, an embodiment of constructing a virtual drive is illustrated. In the embodiment of FIG. 3, a physical storage device 302 is shown as a hard disk drive. In other embodiments, physical storage device 302 includes, but is not limited, to an optical disk drive, a RAM (Random Access Memory) drive, a flash memory device, or the like.

EIDE introduced logical block addressing into the IDE interface family. Instead of referring to a cylinder, head, and sector number of a disk, logical block addressing assigns a unique logical address to each sector of the disk. Logical block addressing was designed to allow addressing hard disks larger than 528 Megabytes (MB). Disk sectors are numbered consecutively from zero to N-1, wherein N is the number of disk sectors, without regard to the disk geometry. While logical block addressing has originally designed for hard disk drives, the logical block addressing scheme may be applied to other storage devices, such as a flash memory devices, Random Access Memory (RAM) drives, or the like.

Physical storage device logic block addresses 304 of physical storage device 302 are shown in FIG. 3. LBAs 308 have been designated for virtual drive 312, while LBAs 306 correspond to device drive 310. It will be understood that the physical sectors of physical storage device 302 assigned to virtual drive 312 may be contiguous, sparse, or any combination thereof.

In the embodiment of FIG. 3, virtual drive LBAs 308 have been renumbered from 0-299, but correspond to physical storage device LBAs 700-999 of physical storage device 302. Device drive 310 has been assigned LBAs 0-699 of physical storage device 302. As discussed further below, when the firmware or OS requests to access an LBA of the virtual drive, the virtual drive controller maps the request to a corresponding LBA on the physical storage device 302.

Virtual drive 312 is perceived by the firmware and the OS as another drive available to the computer system. The firmware and the OS may not know that virtual drive 312 has been carved out of another storage device on the computer system. In actuality, the virtual drive controller proxies the I/O controller to handle I/O requests to the virtual drive. The virtual drive controller passes transactions to the I/O controller to execute the transactions to the requested region of the physical storage device 302. For example, the firmware and the OS may see device drive 310 as drive (C:) and virtual drive 312 as drive (P:). In the embodiment of FIG. 3, virtual drive 312 has stored PE files 320 and 322 using a FAT32 file system 324.

In one embodiment, the LBA range stored for the virtual drive may be defined by the following structures:

```
typedef struct {
    UINT64      LBANumber;     /* starting point of entry */
    UINT32      SectorCount;   /* number of sectors in this entry */
} LBA_ENTRY;
typedef struct {
    UINT64      LBAEntryCount; /* total number of entries */
    //LBA_ENTRY LBAArray[ ];    array of entries
} LBA_DESCRIPTOR;
```

In one embodiment, numerous LBA entry points making up a sparse arrangement may describe the virtual drive. In another embodiment, the virtual drive may be described by a single LBA entry for one unbroken LBA range.

Figure 4:
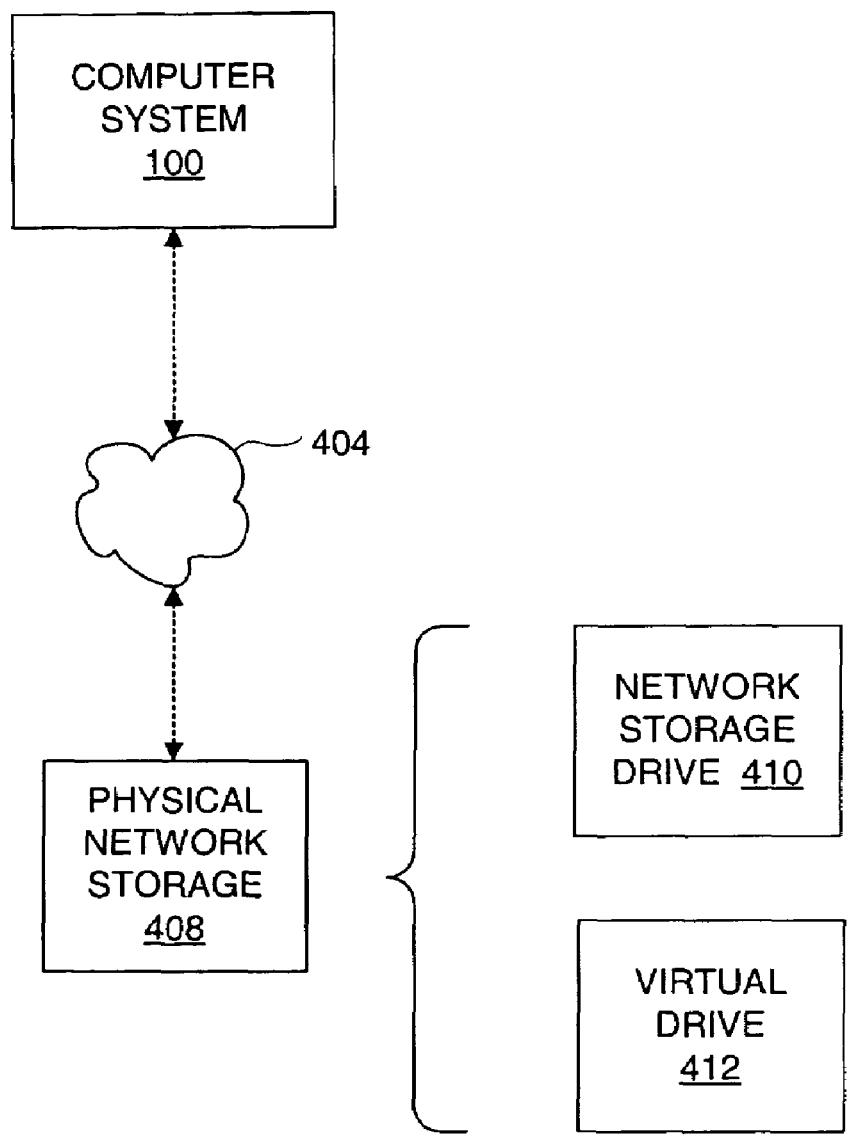
FIG. 4 is a block diagram illustrating one embodiment of an environment that supports a virtual drive in accordance with the teachings of the present invention.

Turning to FIG. 4, an embodiment of a virtual drive 412 is shown. Computer system 100 is coupled to physical network storage 408 via network 404. Virtual drive 412 is constructed from physical network storage 408 according to embodiments described herein. The firmware and OS of computer system 100 "see" network storage drive 410 and virtual drive 412. In one embodiment, the stored LBA range used in constructing virtual drive 412 may include the Internet Protocol (IP) address of physical network storage 408.

In another embodiment, a remote file may be mounted as a virtual drive 412. In this way, the remote file is available to the computer system through all phases of the computer system. This remote file is viewed as a drive by computer system 100.

In one embodiment, virtual drive 412 may include data shared by a plurality of computer systems communicatively coupled to physical network storage 408 via network 404. For example, physical network storage 408 may be part of a network server to support client systems of the network. In this particular embodiment, the virtual drive 412 may include configuration applications that execute during pre-boot of a client to send client configuration information to the server. In another embodiment, virtual drive 412 may include diagnostics and/or utilities that are to be executed by a client as described by a boot script on the client.

FIG. 5A shows a flowchart 500 illustrating one embodiment of the logic and operations to establish a virtual drive. Beginning in a block 504, a computer system is started/reset. Boot instructions stored in the computer system firmware are loaded. In one embodiment, the system boot instructions may begin initializing the platform by conducting a Power-On Self-Test (POST) routine.

Proceeding to a block 506, a VMM and VM are launched. The VM is supported by the VMM. In one embodiment, the VMM and VM operate substantially in compliance with the EFI specification.

In a block 508, the LBA range for the virtual drive is retrieved. In one embodiment, the LBA range is stored on the computer system in a non-volatile storage device. In another embodiment, the LBA range is retrieved from a storage device through a network connection. In yet another embodiment, a user enters the LBA range during the pre-boot phase.

Continuing to a block 510, the virtual drive is constructed based on the retrieved LBA range. In a block 512, a virtual drive controller is initialized to support the virtual drive. In one embodiment, the virtual drive controller is initialized based on the LBA configuration of the newly constructed virtual drive. In another embodiment, the virtual drive controller is loaded from a non-volatile storage device, such as flash memory. In yet another embodiment, the virtual drive controller operates substantially in compliance with the EFI specification.

Proceeding to decision block 514, the logic determines if the firmware of the computer system has requested access to the virtual drive. If the answer is yes, then the logic proceeds to a block 516 where the transaction with the virtual drive is conducted using the virtual drive controller. Access to the virtual drive includes a request to read or to write information to the virtual drive. In one embodiment, the information is formatted such that it is comprehensible by the firmware and the OS. After the transaction is completed, the logic proceeds back to decision block 514.

Figure 5B:
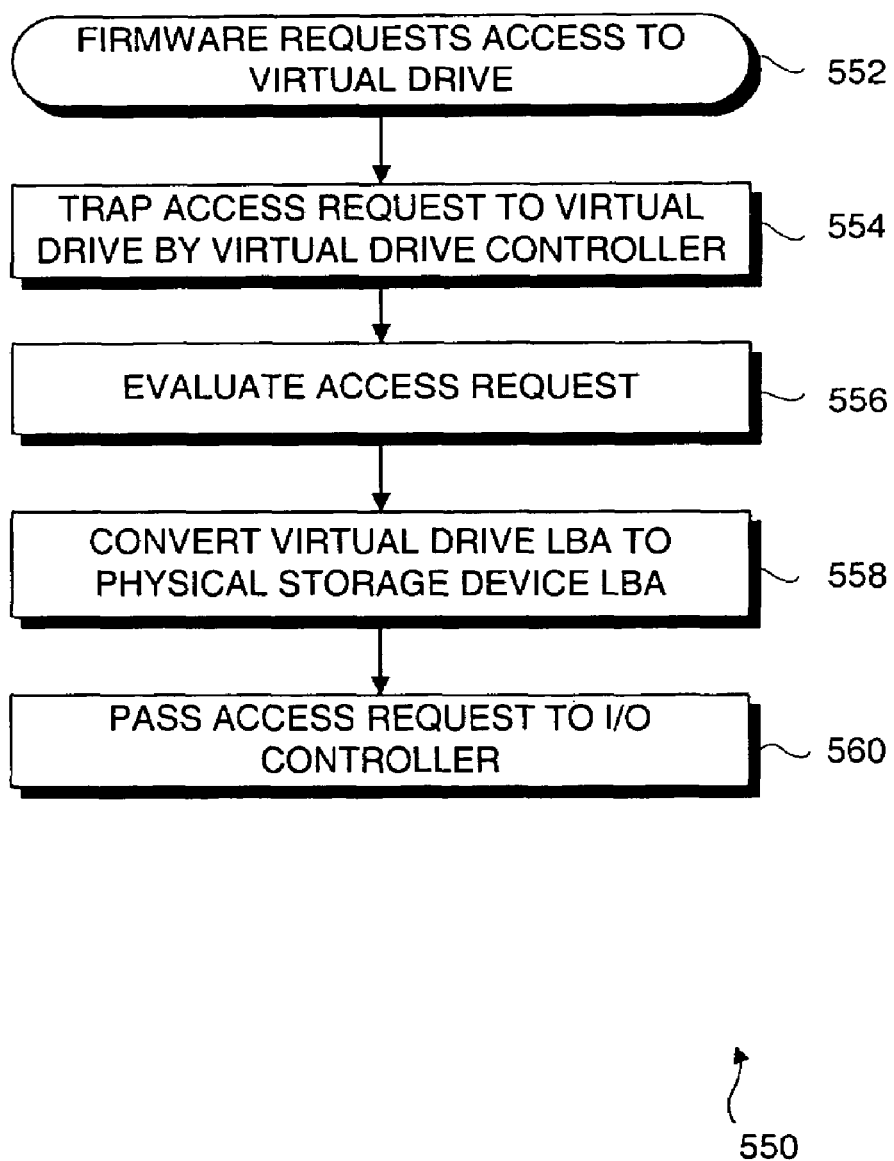
FIG. 5B is a flowchart illustrating one embodiment of the logic and operations to access a virtual drive during pre-boot and OS runtime phases in accordance with the teachings of the present invention.

Turning to FIG. 5B, an embodiment of the logic and operations to conduct a transaction with the virtual drive is illustrated by flowchart 550. In one embodiment, transactions with the virtual drive are conducted by the firmware as if the virtual drive was an IDE drive having an associated IDE controller. Embodiments of transactions with the virtual drive by the OS may be conducted similarly as described in flowchart 550.

Starting in a block 552, the firmware requests access to the virtual drive. For example, the firmware may request to read LBA 1 of the virtual drive. In a block 554, the virtual drive controller traps the access request to the virtual drive. Continuing to a block 556, the virtual drive controller evaluates the access request. In one embodiment, the virtual drive controller evaluates the access request to determine if the request violates a policy of the virtual drive controller. In another embodiment, the virtual drive controller evaluates the access request to determine if it was made to a valid virtual drive LBA.

Continuing to a block 558, the virtual drive controller converts virtual drive LBA of the access request to a corresponding physical drive LBA. Thus, continuing the example of a request to LBA 1, if LBA 1 of the virtual drive corresponds to LBA 100 of the actual physical drive, the virtual drive controller converts the destination of the request accordingly. In one embodiment, the virtual drive LBA may not need to be converted because it maps directly to a corresponding physical storage device LBA. Proceeding to a block 560, the virtual drive controller passes the access request to the I/O controller associated with the physical storage device for processing. The access request passed to the I/O controller may include the converted virtual drive LBA.

Returning to FIG. 5A, if the answer to decision block 514 is no, then the logic proceeds to a block 518 to boot the OS in the VM. As discussed above, OS runtime begins when the OS takes control of the system. In one embodiment, OS runtime starts with the OS loader begins executing.

Continuing to a decision block 520, the logic determines if the OS has requested access to the virtual drive. If the answer is yes, then the logic proceeds to a block 522 to conduct the transaction using the virtual drive controller. In one embodiment, the transaction in block 522 is conducted similarly to the embodiment of FIG. 5B. The logic then returns back to decision block 520.

If the answer to decision block 520 is no, then the logic continues to decision block 524 to determine if the firmware has requested access to the virtual drive. If the answer is yes, then the logic proceeds to block 522 discussed above. If the answer is no, then the logic returns to decision block 520.

Embodiments described herein provide a common repository that is available during the pre-boot and OS runtime phases of a computer system. This common repository allows information to be passed between pre-boot and OS runtime environments. For example, a firmware patch may be downloaded to the virtual drive during OS runtime. The firmware patch is in a format common to the OS and the firmware, such as the PE file format. On the subsequent pre-boot phase of the computer system, the firmware may look to the virtual drive for any executable files to be run. In this example, the firmware may find the firmware patch on the virtual drive and execute the file.

In another example, the virtual drive may provide fault tolerance during a firmware update. A user may download a firmware update during OS runtime and store the firmware update on the virtual drive. Assume that during a firmware update procedure initiated from OS runtime, a system failure occurs. Normally, on re-boot, this may cause a system error because the firmware may be corrupted.

However, according to embodiments described herein, the firmware may find the firmware update on the virtual drive and execute the update in the pre-boot phase. The firmware is capable of executing the firmware update during pre-boot because the update is in a format comprehensible by both the firmware and the OS. Thus, even though a system error occurred during execution of the firmware update at OS runtime, the update may still occur in the next subsequent pre-boot phase.

Figure 6:
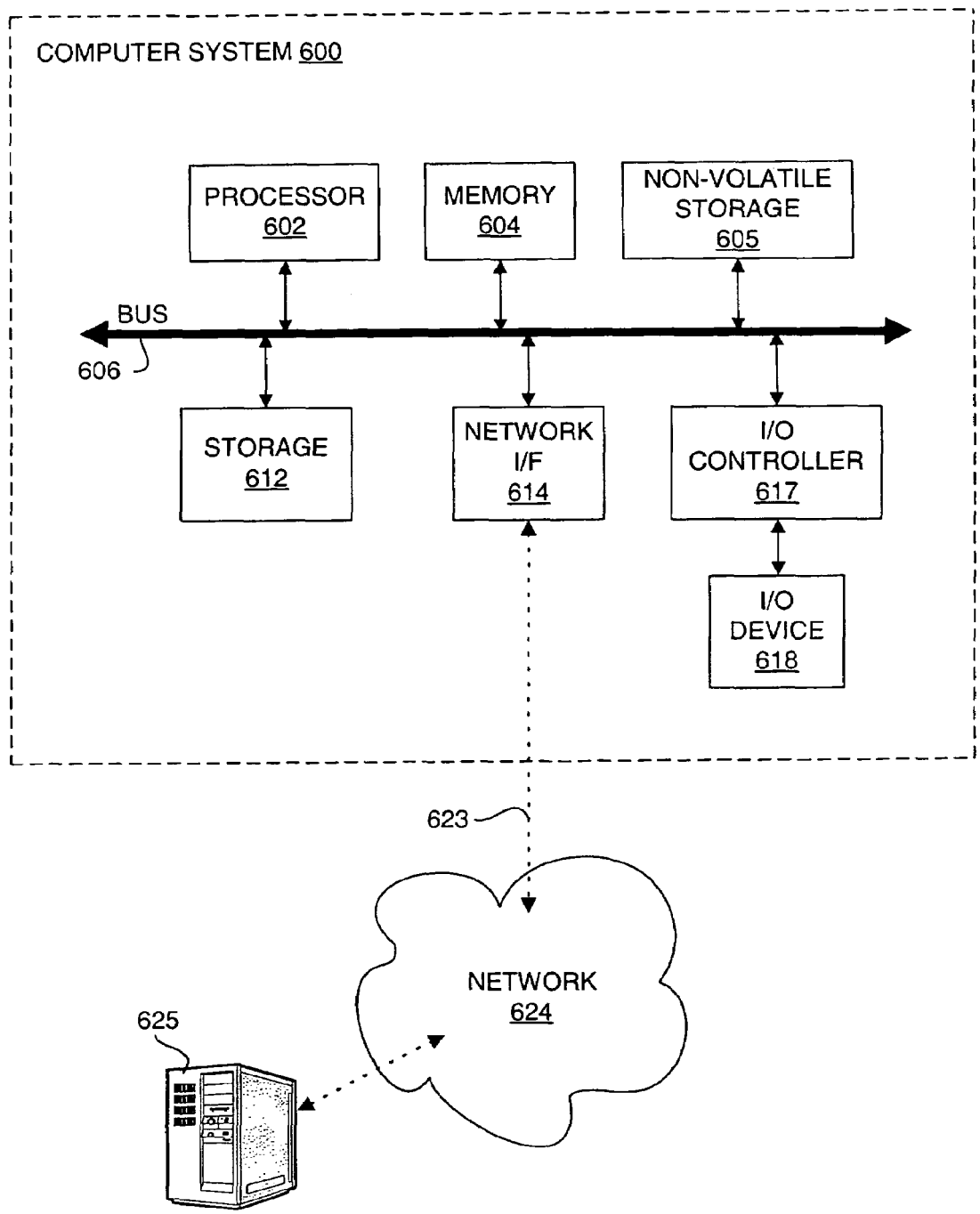
FIG. 6 is a block diagram illustrating one embodiment of an exemplary computer system to implement embodiments of the present invention.

FIG. 6 is an illustration of one embodiment of an example computer system 600 on which embodiments of the present invention may be implemented. Computer system 600 includes a processor 602 coupled to a bus 606. Memory 604, storage 612, non-volatile storage 605, and network interface 614 are also coupled to bus 606. Input/output (I/O) device 618 is coupled to bus 606 via I/O controller 617. Embodiments of computer system 600 include, but are not limited to a desktop computer, a notebook computer, a server, a personal digital assistant, a network workstation, or the like.

The computer system 600 may interface to external systems through the network interface 614. Network interface 614 may include, but is not limited to, a modem, a network interface card (NIC), or other interfaces for coupling a computer system to other computer systems. A carrier wave signal 623 is received/transmitted by network interface 614. In the embodiment illustrated in FIG. 6, carrier wave signal 623 is used to interface computer system 600 with a network 624, such as a local area network (LAN), a wide area network (WAN), the Internet, or any combination thereof. In one embodiment, network 624 is further coupled to a remote computer 625 such that computer system 600 and remote computer 625 may communicate over network 624.

Processor 602 may include, but is not limited to, an Intel Corporation x86, Pentium®, Xeon®, or Itanium® family processor, a Motorola family processor, or the like. In one embodiment, computer system 600 may include multiple processors. Memory 604 may include, but is not limited to, Dynamic Random Access Memory (DRAM), Static Random Access Memory (SRAM), Synchronized Dynamic Random Access Memory (SDRAM), Rambus Dynamic Random Access Memory (RDRAM), or the like. I/O device 618 may include a keyboard, a mouse, a display, a printer, a scanner, or the like.

The computer system 600 also includes non-volatile storage 605 on which firmware and/or data may be stored. Non-volatile storage devices include, but are not limited to, Read-Only Memory (ROM), Flash memory, Erasable Programmable Read Only Memory (EPROM), Electronically Erasable Programmable Read Only Memory (EEPROM), Non-Volatile Random Access Memory (NVRAM), or the like. Storage 612 includes, but is not limited to, a magnetic hard disk, a magnetic tape, an optical disk, or the like. It is appreciated that instructions executable by processor 602 may reside in storage 612, memory 604, non-volatile storage 605, or may be transmitted or received via network interface 614.

For the purposes of the specification, a machine-accessible medium includes any mechanism that provides (i.e., stores and/or transmits) information in a form readable or accessible by a machine (e.g., a computer, network device, personal digital assistant, manufacturing tool, any device with a set of one or more processors, etc.). For example, a machine-accessible medium includes, but is not limited to, recordable/non-recordable media (e.g., read only memory (ROM), random access memory (RAM), magnetic disk storage media, optical storage media, a flash memory device, etc.). In addition, a machine-accessible medium may include propagated signals such as electrical, optical, acoustical or other form of propagated signals (e.g., carrier waves, infrared signals, digital signals, etc.).

It will be appreciated that in one embodiment, computer system 600 may execute operating system software. For example, one embodiment of the present invention utilizes Microsoft Windows® as the operating system for computer system 600. Other operating systems that may also be used with computer system 600 include, but are not limited to, the Apple Macintosh operating system, the Linux operating system, the Unix operating system, or the like. In one embodiment, computer system 600 employs the Intel® Vanderpool Technology (VT). VT facilitates the separation of VMs and the transitions between VMs and the VMM.

The above description of illustrated embodiments of the invention, including what is described in the Abstract, is not intended to be exhaustive or to limit the embodiments to the precise forms disclosed. While specific embodiments of, and examples for, the invention are described herein for illustrative purposes, various equivalent modifications are possible, as those skilled in the relevant art will recognize. These modifications can be made to embodiments of the invention in light of the above detailed description.

The terms used in the following claims should not be construed to limit the invention to the specific embodiments disclosed in the specification. Rather, the following claims are to be construed in accordance with established doctrines of claim interpretation.

What is claimed is:

1. A method, comprising:
   constructing a virtual drive from a physical storage device of a computer system during a pre-boot phase of the computer system, wherein constructing the virtual drive includes:
      retrieving a logical block address (LBA) range designated for the virtual drive; and
      assigning a portion of logical block addresses of the physical storage device to the virtual drive based on the LBA range;
   initializing a virtual drive controller during the pre-boot phase, the virtual drive controller to support the virtual drive;
   accessing information on the virtual drive using the virtual drive controller by firmware of the computer system during the pre-boot phase; and
   accessing the information on the virtual drive using the virtual drive controller by an operating system of the computer system during an operating system runtime phase, wherein the information is comprehensible by the firmware and the operating system and wherein the virtual drive is perceived by the firmware and the operating system as a separate drive from a device drive in the physical storage device.

2. The method of claim 1 wherein the LBA range is stored in non-volatile storage of the computer system.

3. The method of claim 1 wherein accessing the information on the virtual drive comprises:
   trapping an access request to the information by the virtual drive controller, wherein the access request includes a virtual drive logical block address; and
   converting the virtual drive logical block address to a physical storage device logical block address.

4. The method of claim 3, further comprising passing the access request to an input/output controller associated with the physical storage device, the access request including the converted virtual drive logical block address.

5. The method of claim 1, further comprising accessing the information on the virtual drive using the virtual drive controller by the firmware during the operating system runtime phase.

6. The method of claim 1 wherein the information is in a Portable Executable (PE) file format.

7. The method of claim 1 wherein the physical storage device includes at least one of a hard disk, a flash memory device, or a random access memory drive.

8. The method of claim 1 wherein the physical storage device comprises a network storage device coupled to the computer system through a network.

9. The method of claim 1, further comprising:
   launching a virtual machine monitor (VMM), the VMM including the virtual drive controller; and
   launching a virtual machine (VM) supported by the VMM, the VM to support the firmware and the operating system.

10. The method of claim 1 wherein the firmware and the virtual drive controller operate substantialiy in accordance with an Extensible Firmware Interface (EFI) spectfication.

11. The method of claim 1, further comprising enforcing a policy of the virtual drive controller to prevent information not comprehensible by the firmware and the operating system from being stored on the virtual drive.

12. An article of manufacture comprising:
   a tangible machine-accessible storage medium including a plurality of instructions which when executed perform operations comprising:
      constructing a virtual drive from a physical storage device of a computer system during a pre-boot phase of the computer system, wherein constructing the virtual drive includes:
         retrieving a logical block address (LBA) range designated for the virtual drive; and
         assigning a portion of logical block addresses of the physical storage device to the virtual drive based on the LBA range;
      initializing a virtual drive controller during the pre-boot phase, the virtual drive controller to support the virtual drive;
      accessing a file on the virtual drive using the virtual drive controller by firmware of the computer system during the pre-boot phase of the computer system; and
      accessing the file on the virtual drive using the virtual drive controller in response to a request from an operating system of the computer system during an operating system runtime phase, wherein the file is in a file format comprehensible by the firmware and the operating system and wherein the virtual drive is perceived by the firmware and the operating system as a separate drive from a device drive in the physical storage device.

13. The article of manufacture of claim 12 wherein execution of the plurality of instructions further perform operations comprising:
   launching a virtual machine monitor (VMM), the VMM including the virtual drive controller; and
   launching a virtual machine (VMM) supported by the VMM, the VMM to support the finnware and the operating system.

14. The article of manufacture of claim 12 wherein accessing the file on the virtual drive comprises:
- trapping an access request to the file by the virtual drive controller, wherein the access request includes a virtual drive logical block address;
- converting the virtual drive logical block address to a physical storage device logical block address; and
- passing the access request to an input/output controller associated with the physical storage device, the access request including the converted virtual drive logical block address.

15. The article of manufacture of claim 12 wherein the physical storage device includes at least one of a hard disk, a flash memory device, or a random access memory drive.

16. The article of manufacture of claim 12 wherein the physical storage device comprises a network storage device coupled to the computer system through a network.

17. The article of manufacture of claim 12 wherein the file format includes a Portable Executable (PE) file format.

18. The article of manufacture of claim 12 wherein the firmware and the virtual drive controller operate substantially in accordance with an Extensible Firmware Interface (EFI) specffication.

19. A computer system, comprising:
- a processor;
- a hard disk drive operatively coupled to the processor; and
- at least one non-volatile storage device operatively coupled to the processor, the at least one non-volatile storage device including firmware instructions which when executed by the processor perform operations comprising:
  - constructing a virtual drive from the hard disk drive during a pre-boot phase of the computer system, wherein constructing the virtual drive includes:
    - retrieving a logical block address (LBA) range designated for the virtual drive; and
    - assigning a portion of logical block addresses of the hard disk drive to the virtual drive based on the LBA range;
  - initializing a virtual drive controller during the pre-boot phase, the virtual drive controller to support the virtual drive;
  - accessing a file on the virtual drive using the virtual drive controller by firmware of the computer system during the pre-boot phase; and
  - accessing the file on the virtual drive using the virtual drive controller in response to a request from an operating system of the computer system during an operating system runtime phase, wherein the file is in a file format comprehensible by the firmware and the operating system and wherein the virtual drive is perceived by the firmware and the operating system as a separate drive from a device drive in the physical storage device.

20. The computer system of claim 19 wherein execution of the plurality of firmware instructions further perform operations comprising accessing the file on the virtual drive using the virtual drive controller by the firmware during the operating system runtime phase.

21. The computer system of claim 19 wherein accessing the file on the virtual drive comprises:
- trapping an access request to the file by the virtual drive controller, wherein the access request includes a virtual drive logical block address;
- converting the virtual drive logical block address to a hard disk drive logical block address to generate a converted virtual drive logical block address; and
- passing the access request to an input/output controller associated with the hard disk drive, the access request including the converted virtual drive logical block address.

22. The computer system of claim 19 wherein the firmware instructions to operate substantially in compliance with an Extensible Firmware Interface (EFI) specification.

* * * * *